No. 862,504. PATENTED AUG. 6, 1907.
D. NOFZINGER.
COMBINED HAY GATHERER AND PRESS.
APPLICATION FILED OCT. 31, 1906.

4 SHEETS—SHEET 1.

WITNESSES:
E. H. Stewart
C. Bradway

Dan Nofzinger, INVENTOR.
By C. A. Snow & Co.
ATTORNEYS

No. 862,504. PATENTED AUG. 6, 1907.
D. NOFZINGER.
COMBINED HAY GATHERER AND PRESS.
APPLICATION FILED OCT. 31, 1906.

4 SHEETS—SHEET 2.

WITNESSES:
C. F. Stewart
C. Bradway

Dan Nofzinger, INVENTOR.
By C. A. Snow & Co.
ATTORNEYS

No. 862,504.

PATENTED AUG. 6, 1907.

D. NOFZINGER.
COMBINED HAY GATHERER AND PRESS.
APPLICATION FILED OCT. 31, 1906.

4 SHEETS—SHEET 3.

WITNESSES:

Dan Nofzinger, INVENTOR.

By C. A. Snow & Co.

ATTORNEYS

No. 862,504. PATENTED AUG. 6, 1907.
D. NOFZINGER.
COMBINED HAY GATHERER AND PRESS.
APPLICATION FILED OCT. 31, 1906.
4 SHEETS—SHEET 4.
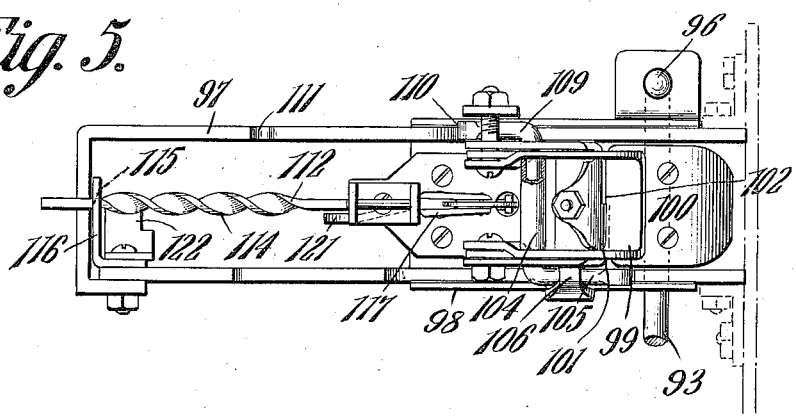
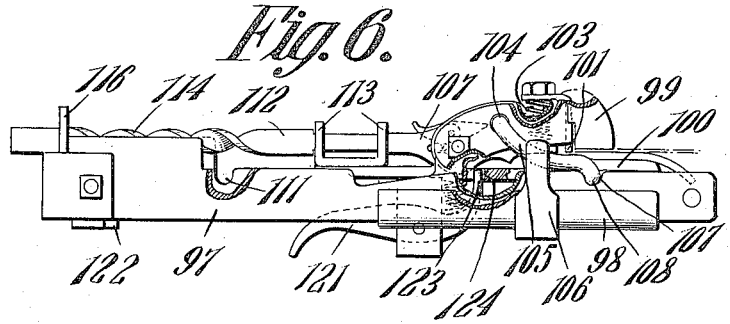
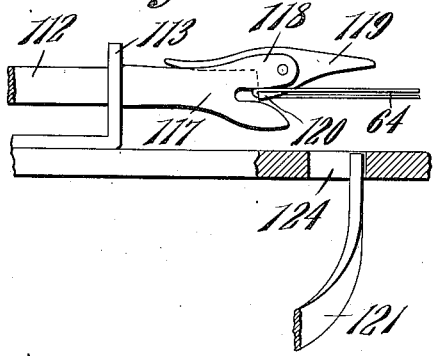
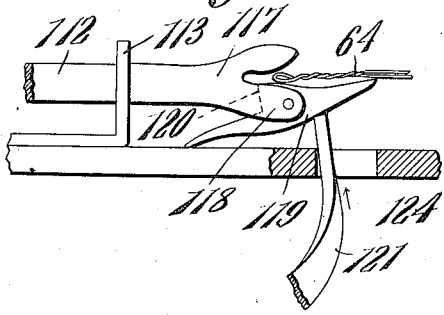
WITNESSES:
E. W. Stewart
C. Bradway
Dan Nofzinger, INVENTOR.
By C. A. Snow & Co.
ATTORNEYS

UNITED STATES PATENT OFFICE.

DAN NOFZINGER, OF LESLIE, ARKANSAS.

COMBINED HAY GATHERER AND PRESS.

862,504.         Specification of Letters Patent.         Patented Aug. 6, 1907.

Application filed October 31, 1906. Serial No. 341,460.

*To all whom it may concern:*

Be it known that I, DAN NOFZINGER, a citizen of the United States, residing at Leslie, in the county of Searcy and State of Arkansas, have invented a new and useful Combined Hay Gatherer and Press, of which the following is a specification.

This invention has relation to combined hay gatherers and presses and it consists in the novel construction and arrangement of its parts as hereinafter shown and described.

The object of the invention is to provide an implement adapted to be drawn over the field and collect hay after it has been windrowed and elevate the same and press it into bundles, bind them and deliver them to one side.

The invention consists primarily of a wheel mounted frame to which is attached a rake. A conveyer is located in advance of the rake and receives the hay from the rake and elevates the same and deposits it into the baling box. A plunger is mounted for reciprocation in said box and is actuated by power conveyed from traction wheels. The said plunger is provided with attachments which coöperate with binding and tying mechanisms by means of which the bundles, when pressed, are suitably bound and tied.

Figure 1:
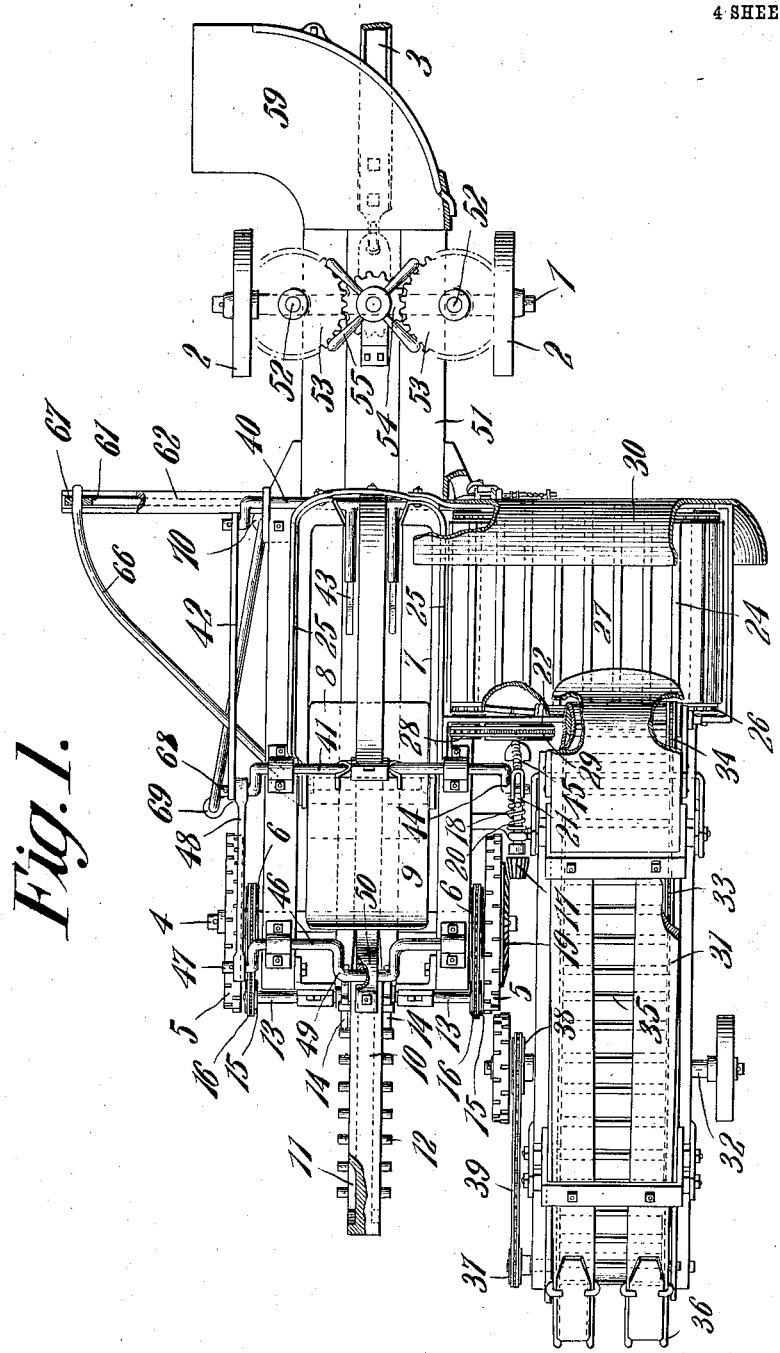
Figure 2:
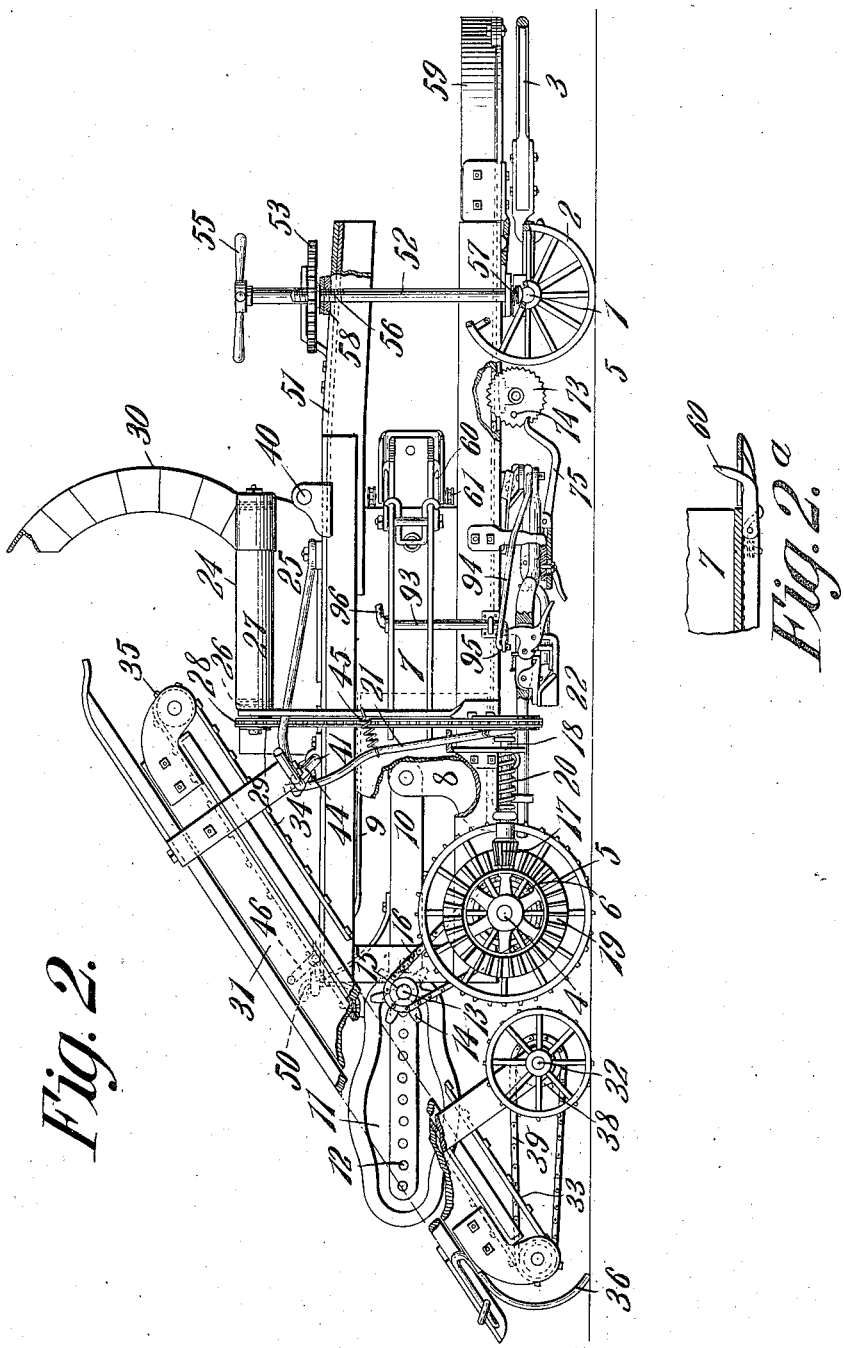
Figure 3:
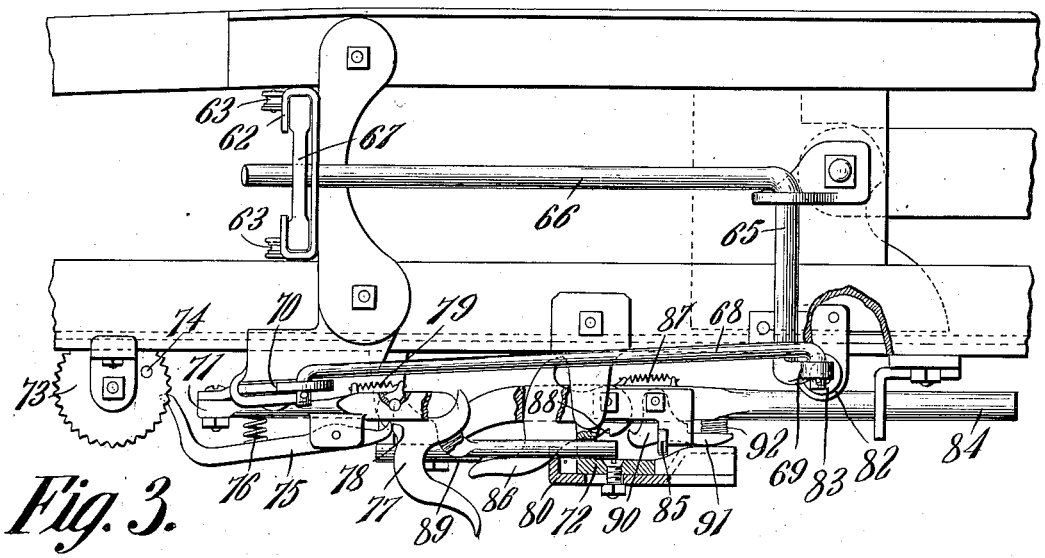
Figure 4:
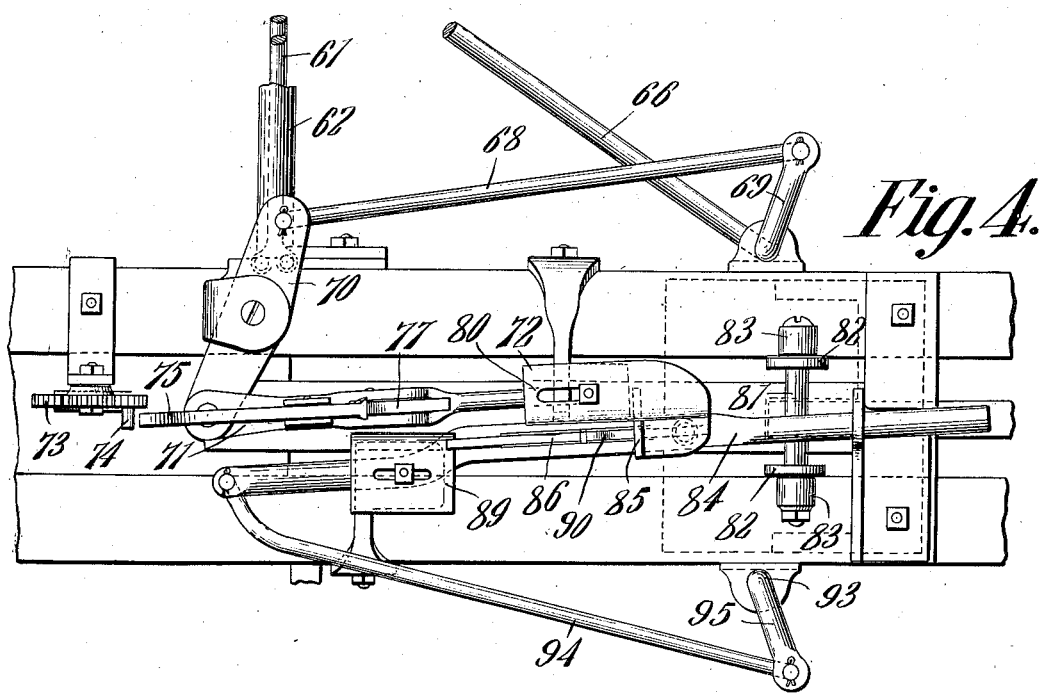

In the accompanying drawings:—Figure 1 is a top plan view of the gatherer and press with parts broken away. Fig. 2 is a side elevation of the same with parts broken away. Fig. 2ª is a detail view of the hay retainer. Fig. 3 is a detail side elevation of the needle actuating mechanism. Fig. 4 is a bottom view of the needle actuating mechanism and the looper mechanism. Fig. 5 is a side elevation of the looper. Fig. 6 is an edge view of the same with parts broken away. Fig. 7 is a side elevation of the looper bill. Fig. 8 is a side elevation of the looper bill showing its position at the completion of a loop.

The forward end of the implement is mounted on the front axle 1 which in turn is provided at its ends with the supporting wheels 2, 2. The tongue 3 is suitably attached to said axle 1. The rear portion of the implement is supported upon the axle 4 upon the ends of which are located the traction wheels 5. The said axle 4 rotates with the wheels 5 and is provided with the sprocket wheels 6. The baling box 7 is mounted upon the axles 1 and 4 and the plunger 8 is adapted to reciprocate in the said box 7. The top of the said plunger is provided with the rearwardly extending shield 9 which is preferably made of sheet metal and is substantially of the same dimensions as the inside measurements of the said baling box. That is to say, when the plunger 8 is extended into the furthest position into the said box, that it may assume the shield 9 closes the upper end of the box. The pitman 10 is pivotally attached at its forward end to the said plunger 8 and is provided on each side with the substantially elliptical channels 11. The studs 12 are arranged in sets, one located on each side of the said pitman and each set of studs is surrounded by a channel 11.

The shafts 13 are journaled in the framework of the implement and each said shaft is provided near its inner end with a gear wheel 14 and each said gear wheel is adapted to mesh with a set of the studs 12. The inner ends of the said shafts 13 enter the channels 11 and are guided by the same. The sprocket wheels 15 are attached to the shafts 13 and the sprocket chains 16 surround the sprocket wheels 15 and 6.

The bevel gear wheel 17 is attached to the shaft 18 and meshes with the bevel gear 19 fixed upon the rear axle 4. The shaft 18 is adapted to be moved longitudinally to throw the gear wheels 17 and 19 in and out of mesh. The coil spring 20 surrounds the said shaft and its tension is such as to have a tendency to maintain the said shaft in its rearmost position. The lower end of the lever 21 is pivotally connected with the said shaft 18 and is fulcrumed to the framework so that, when the upper end of the said lever is moved to the rear, the said shaft 18 is moved longitudinally to the front. The sprocket wheel 22 is attached to the said shaft 18. The horizontal conveyer 24 is located substantially at a level with the upper edges of the hoods 25 of the baling box 7. The said conveyer comprises the two rollers 26 around which the apron 27 passes, the said apron being provided with usual slats extending transversely of the same. The shaft of the inner roller 26 is provided with a sprocket wheel 28 and the sprocket chain 29 passes around the sprocket wheels 22 and 28. Located in advance of the said conveyer 24 is the partition 30. The upper end of the inclined conveyer 31 is pivotally attached to the horizontal conveyer 24. The said conveyer 31 is mounted at its lower end upon the wheel supported axle 32 and the continuous belt or chains 33 pass around the rollers or wheels 34 located at the opposite ends of the said inclined conveyer. The said belts or chains 33 are provided with the usual transversely extending slats 35. The spring teeth 36 are attached to the lower end of the said inclined conveyer 31 and are adapted to take the hay up from the windrows and deposit the same upon the belts or chains 33 which, in turn, convey the said material up and deposit it upon the horizontal conveyer 24 which, in turn, carries it toward the baling box 7 and dumps the same between the hoods 25 thereof. In the meantime, the plunger 8 advances and the hay thus deposited in the box, is pressed. The sprocket wheel 37 is attached to the shaft of the lower roller 34 of the inclined conveyer 31 and the sprocket wheel 38 is attached to the axle 32. The sprocket chain 39 surrounds the sprocket wheels 37 and 38 and, as the said axle revolves, transmits rotary motion to the said rollers 34, which, in turn, actuates the belts or chains of the inclined conveyer 31.

The bell crank shaft 40 is journaled in advance of the baling box 7 and the bell crank shaft 41 is journaled at the rear end thereof. The link 42 connects the bell cranks of the said shafts together. The fingers 43 are attached to the shaft 40 and are adapted to swing down and force the hay down into the body of the baling box 7. At a point in alinement with the upper end of the lever 21 the bell crank shaft 41 is provided with a crank 44 which is adapted to strike the upper end of the said lever 21 and move the same to throw bevel gears 17 and 19 out of mesh. This movement occurs when the fingers 43 are down in the baling box 7 and consequently, at such time, the hay will not be passed by the conveyer 24 into the said baling box and deposit upon the top of the said fingers. The coil spring 45 is attached at one end to the crank 44 and through its tension the fingers 43 are normally held in elevated positions and the said crank 44 out of engagement with the upper end of the lever 21. The crank shaft 46 is journaled in alinement with the bell crank shaft 40 and 41 and the outer bell crank 47 of the said shaft 46 is connected by means of a link 48 with the bell crank of shaft 41. The intermediate portion of the crank shaft 46 is provided with a crank 49. Said crank is located in the path of the lug 50 which is carried by the pitman 10. Consequently, as the said pitman moves towards the rear and the lug 50 approaches the crank 49, the said lug engaging the said crank causes the crank 47 to describe a partial revolution which, through the connecting links 48 and 42, causes the shafts 40 and 41 to move as above described.

A means is provided for drawing the upper and lower sides 51 of the baling chamber together. Said means consists of the vertical shafts 52 to the upper ends of which the gear wheels 53 are attached. The intermediate gear wheel 54 meshes with the gear wheels 53 and the shaft of the said wheel 54 is provided with a hand wheel 55. The upper portions of the shafts 52 are provided with screw threads 56 which enter threaded perforations at the centers of the gear wheels 53. The coil springs 57 surround the lower ends of the said shafts 52 and have a tendency to maintain the lower surfaces of the gear wheels 53 in contact with the laterally extending lugs 58. From the above description, it is obvious that, as the hand wheel 55 is turned, the threads of the gear wheels 53 engaging the threads of the vertical shafts 52 will move the said shafts longitudinally and the upper and lower sides of the said baling chamber will be pinched together or spread apart. The forward end of the said baling chamber communicates with the laterally disposed chute 59. After the bale is completed, it is passed from the said chamber upon the said chute from which it is deposited upon the ground. The spring actuated hay checks 60 are located in the vertical sides of the baling chamber 51 and are adapted to prevent the hay from following the plunger 8 back as the same retreats.

The needles 61 are arranged for simultaneous reciprocation in the guide 62. The said needles are pro-
vided at their inner ends with the pulleys 63 over which the wire 64 passes, the said needles carrying the said wire across the baling chamber 51 in advance of the hay which is formed into the bale. The shaft 65 is journaled to the side of the implement and is provided at its upper end with the crank 66 which passes through the guide 62 and enters the eye of the portion 67 which connects the said needles 61 together. The link 68 is pivotally attached to the lower bell crank 69 of the shaft 65 and the forward end of said link is pivotally attached to the rocker 70. The inner end of the rocker 70 is pivoted to the rod 71, the rear end of which passes through the guide 72. The serrated wheel 73 is journaled under the baling chamber 51 and its upper edge extends through an opening in the bottom of the said chamber. The said wheel is provided on one side with a wrist pin 74 and the forward end of the rod 71 is provided with a trip 75 which is located in the path of the said wrist pin 74. The spring 76 bears against the said trip 75 and has a tendency to maintain the forward end thereof in its lowermost position. The trip 77 is also pivoted to the rod 71 and is provided in its under side with the notch 78. The rear end of the trip 75 is adapted to enter said notch 78 and maintain the upper end of the trip 77 in a depressed position against the tension of the spring 79. The skid 80 is located in the path of the lower end of the trip 77 and is adapted to swing the upper end of the said trip down. The spring 79 normally maintains the upper end of the said trip 77 in the path of the cross-pin 81 which is carried by the depending lugs 82 attached to the under side of the plunger 8 and extending through the bottom of the baling box 7. The friction rollers 83 are journaled upon the ends of the cross-pin 81 and are adapted to run against the under side of the bottom of the baling box 7. As the said plunger 8 retreats, the said cross-pin engages the upper end of the trip 77 and the rod 71 is moved toward the rear until the lower end of the said trip 77 comes in contact with the skid 80, when the said trip is turned upon its pivot and the upper end thereof is carried below the path of the cross-pin 81, when the plunger may move independently with relation to the said rod 71, when the skid 80 presses the trip 77 down, the end of the trip 75 enters the notch 78 of the trip 77 and holds the same in such position against the tension of the spring 79. However, as the hay is accumulated in the baling chamber 7 and is moved toward the forward end thereof, the serrated wheel 73 is turned by degrees or stages and eventually the wrist pin 74 comes around and strikes the forward end of the trip 75 and elevates the same. This removes the opposite end of the said trip from the notch 78 and the tension of the said spring comes into play and elevates the upper end of the trip 77 into the path of the cross-pin 71 when the operation above described may be repeated. As the rod 71 is moved longitudinally, the rocker 70 is moved and through the link 68 the shaft 65 is partially rotated and the crank 66 moves the needles 61 across the baling chamber 51 and the said wire is caught and retained at the opposite side and is twisted and bound in a manner as will be hereinafter explained.

The rod 84 is provided with the laterally extending lug 85 which is located in the path of the rod 71 and as the last said rod moves longitudinally, the said lug is engaged by the said rod 71 and the rod 84 is moved in a rearward direction. The trip 86 is pivoted to the rod 84 and tension of the spring 87 is such as to have a tendency to maintain the upper end of said trip in the path of the cross-pin 81. The said trip is provided at its rear edge with the notch 88. The skid 89 is located in the path of the forward end of the said trip 86 and, when engaged by the said end, depresses the upper end thereof against the tension of the spring 87. The trip 90 is also pivoted to the rod 84 and is adapted to enter the notch 88 of the trip 86 and hold the same in depressed position. The skid 91 is located in the path of the trip 90 and the spring 92 bears upon the rear end of said trip 90 and has a tendency to maintain the same in its lowermost position. The shaft 93 is journaled at the side of the baling-box 7 and the link 94 is pivotally attached at one end to the said rod 84 and at its other end to the bell crank 95 of the said shaft 93. The upper bell crank 96 of the said shaft 93 is adapted to reciprocate and operate the wire looping and cutting mechanism. The wire looping and cutting mechanism comprises the parallel bars 97 which are attached at their inner ends to the frame of the implement. The shuttle 98 is reciprocated upon the side bars by the bell crank 95. The clamp 99 is hinged to the said shuttle 98 and is adapted to impinge the wire against the anvil 100. The cutter 101 is pivoted in alinement with the hinge points of the clamp 99. The forward end of said cutter enters the recess 102 formed at the rear of the wire impinging surfaces of the said clamp. The coil spring 103 bears at its lower end against the said clamp and at its upper end against the cutter. The tension of said spring is such as to have a tendency to retain the cutter 101 in elevated position with relation to the clamp 99. The shaft 104 passes through the clamp 99 and cutter 101, the perforations in the said cutter that receives said shaft 104 being circular while those in the clamp are elongated. The shaft 104 is provided at one end with a crank 105 which is curved longitudinally and which passes under the inwardly extending end of the lug 106, said lug in turn being attached to the shuttle 98. The lower end of the crank 105 is bent down as at 107 and is adapted to enter the notch 108 provided in the edge of the lower parallel bar 97. The opposite end of the said shaft 104 is provided with a crank 109 which is also curved longitudinally and is provided at its lower end with the bent down portion 110 which is adapted to enter the notch 111 provided in the upper parallel bar 97. By the coöperation of the bent down portions 107 and 110 which enter the notches 108 and 111 as the said shuttle arrives at the end of its inward and outward movement, the clamp 99 is swung away from the anvil 100 but, while the said shuttle is at points intermediate of the termini of its movement, the said clamp is confined in close contact with the said anvil and retains the wire against the same. At a point intermediate of the termini of the movement of the said shuttle, the lug 106 rides up upon the crank 105 and causes the cutter 101 to descend with relation to the edge of the anvil 100 and cut the wire.

The arm 112 is mounted for rotation in the lugs 113. The rear portion of said arm is spirally twisted as at 114 and passes through a slot 115 in the lug 116. The end of said arm is provided with a head 117. The said head 117 is provided with the bifurcations 118 and the retainer 119 is pivoted to the one set of bifurcations 118. The said retainer is provided at its inner edge with a shoulder 120 beneath which the bale wire passes and by means of which the said wire is retained in the said head. As the shuttle 98 moves toward the outer ends of the parallel bars 97, the spiral portion 114 of the arm 112 engaging the sides of the slot 115 the said arm is caused to rotate and the wire retained by the head 117 thereof is twisted. At the end of the outward movement of the said shuttle the trip 121 engages the lug 122 and the said trip is moved against the tension of the spring 123 and the inner end of said trip passing through the perforation 124 in the said shutter 98 engages the edge of the retainer 119 and moves the same on its pivot so that the shoulder 120 is carried within the edges of the bifurcations 118 to which the said retainer is pivoted. Consequently, the loop of wire is liberated from the said retainer and head after the same had been properly twisted and tightened.

Having described my invention, what I claim as new and desire to secure by Letters Patent is:—

1. An apparatus such as described comprising a baling-box, a plunger reciprocating in the same, fingers adapted to swing into said box as the plunger retreats and an intermittently moving conveyer leading to the box and operating only when the fingers are out of the same.

2. An apparatus such as described comprising a baling box, a plunger mounted for reciprocation therein, fingers adapted to swing into said box as the plunger retreats, an intermittently moving conveyer located adjacent to and extending transversely of said box and a continuously elevating conveyer leading to the first said conveyer and extending longitudinally of the box, the first said conveyer operating only when the fingers are out of the box.

3. An apparatus such as described comprising a baling box, a plunger mounted for regular uninterrupted reciprocation therein, fingers adapted to enter the box as the plunger retreats, a conveyer leading to the box, means for interrupting the operation of said conveyer when the said fingers are swung into the box, a binding mechanism, and means for actuating the binding mechanism when the bale advances toward completion.

4. An apparatus such as described comprising a baling box, a plunger mounted for reciprocation therein, a pitman pivoted to said plunger and having on each side substantially elliptical channels, a set of spurs attached to each side of the pitman and each set being surrounded by a channel, shafts journaled to the implement, gear wheels fixed to said shafts and meshing with said spurs, the ends of said shafts entering said channels.

5. An apparatus such as described comprising a baling box, a plunger mounted for reciprocation therein, a shaft journaled in advance of the box, a shaft journaled in the rear of the box, a link connecting said shafts together, a bell crank shaft journaled in alinement with the before-mentioned shafts, and a link connecting said bell crank shaft with the first said shafts, fingers attached to the shaft located in advance of the box, and a lug connected with the plunger and adapted to engage the bell crank of the last said shaft.

6. An apparatus such as described comprising a baling box, a plunger mounted for reciprocation therein, a conveyer leading to said box, a shaft journaled in advance of the box, a shaft journaled in the rear of the box, and a bell crank shaft suitably journaled, links connecting the three shafts together, means actuating said conveyer, the second shaft adapted to interrupt the operation of said conveyer when the same is partially rotated, fingers carried by the shaft located in advance of the baling box.

7. An apparatus such as described comprising a baling box, a plunger mounted for reciprocation therein, a bale chamber located in advance of the box, a means for contracting the sides of said bale chamber consisting of shafts attached at their lower ends to the lower side of the bale chamber, springs bearing against the lower ends of said shafts, the upper ends of said shafts being screw threaded, gear wheels threaded upon the upper ends of the shafts, lugs attached to the upper side of the bale chamber and receiving said shafts, a gear wheel mounted for rotation and meshing with the said shaft gears.

8. An apparatus such as described comprising a baling box, a plunger mounted for reciprocation therein, a baling chamber located in advance of said baling box, a means for contracting the sides of said chamber, and a delivery chute located in advance of the baling chamber and leading to one side thereof.

In testimony that I claim the foregoing as my own, I have hereto affixed my signature in the presence of two witnesses.

DAN NOFZINGER.

Witnesses:
C. V. RYNO,
S. A. GRAY.